United States Patent [19]

Pettipher et al.

[11] 4,050,095
[45] Sept. 20, 1977

[54] CALL LOAD SHARING SYSTEM BETWEEN A PLURALITY OF DATA PROCESSING UNITS

[75] Inventors: Rodney Pettipher, Paris; Lucien Nicolas Leon Viellevoye, Ris-Orangis; Albert Kruithof, Ville D'Avray, all of France

[73] Assignee: International Standard Electric Corporation, New York, N.Y.

[21] Appl. No.: 662,670

[22] Filed: Mar. 1, 1976

Related U.S. Application Data

[63] Continuation of Ser. No. 367,857, June 7, 1973, abandoned.

[51] Int. Cl.² ............................................. G06F 15/16
[52] U.S. Cl. ................................................... 364/200
[58] Field of Search ........................ 340/172.5; 445/1; 179/18 ES, 18 EA, 27 D; 364/200, 900

[56] References Cited

U.S. PATENT DOCUMENTS

| | | | |
|---|---|---|---|
| 3,348,210 | 10/1967 | Ochsner | 340/172.5 |
| 3,483,524 | 12/1969 | De Buck et al. | 179/18 ES |
| 3,517,123 | 1/1970 | Harr et al. | 179/18 ES |
| 3,865,999 | 2/1975 | Spitaels | 340/172.5 X |

Primary Examiner—Harvey E. Springborn
Attorney, Agent, or Firm—J. B. Raden; M. M. Chaban

[57] ABSTRACT

A system is disclosed for sharing the work load of incoming calls between two computers. The system employs memories recording the total number of calls to be processed and the number to be processed by a particular one of the two computers in a given time period. The first calls received are sent to the one computer. When the number of calls actually processed by the one computer has been received the following calls are sent to the second computer to be processed. When the total number to be processed is actually reached, the system is reset to its initial state and the cycle is repeated.

2 Claims, 5 Drawing Figures

FIG.5

|     |   | BN |   |   |   |   |   |   |   | BM |    |    |    |    |    |    |
|-----|---|----|---|---|---|---|---|---|---|----|----|----|----|----|----|----|
|     | 0 | 1  | 2 | 3 | 4 | 5 | 6 | 7 | 8 | 9  | 10 | 11 | 12 | 13 | 14 | 15 |
| BMN | 0 | 0  | 1 | 0 | 0 | 0 | 1 | 1 | 0 | 0  | 0  | 1  | 0  | 1  | 1  | 0  |

|      |   | CN |   |   |   |   |   |   |   | CM |    |    |    |    |    |    |
|------|---|----|---|---|---|---|---|---|---|----|----|----|----|----|----|----|
|      | 0 | 1  | 2 | 3 | 4 | 5 | 6 | 7 | 8 | 9  | 10 | 11 | 12 | 13 | 14 | 15 |
| CMN1 | 0 | 0  | 0 | 0 | 0 | 0 | 0 | 1 | 1 | 0  | 0  | 0  | 0  | 0  | 0  | 0  |
| SUB1 | 1 | 1  | 0 | 1 | 1 | 1 | 0 | 1 | 1 | 0  | 1  | 0  | 1  | 0  | 1  | 0  |

| CMN2 | 0 | 0 | 0 | 0 | 1 | 0 | 1 | 1 | 1 | 1 | 0 | 1 | 0 | 1 | 1 | 0 |
| SUB2 | 1 | 1 | 1 | 0 | 1 | 0 | 0 | 0 | 1 | 1 | 0 | 0 | 0 | 0 | 0 | 0 |

| CMN3 | 0 | 0 | 1 | 0 | 0 | 0 | 1 | 1 | 0 | 1 | 0 | 1 | 0 | 1 | 1 | 0 |
| SUB3 | 0 | 0 | 0 | 0 | 0 | 0 | 0 | 0 | 1 | 0 | 0 | 0 | 0 | 0 | 0 | 0 |

CALL LOAD SHARING SYSTEM BETWEEN A PLURALITY OF DATA PROCESSING UNITS

This is a continuation, of application Ser. No. 367,857 filed June 7, 1973 now abandoned.

BACKGROUND OF THE INVENTION

1. Field of the Invention.

The invention concerns a call load sharing system between several data processing units applicable in particular to a real time data processing system such as, for example, a central control telephone or telegraph exchange, a remote control system or an analogous system.

2. Description of the Prior Art

In a central control system, a data processing central unit which is generally a stored program computer controls the operation at the different exchange signalling and switching units. For this purpose, it interrogates them at regular time intervals by means of scanners in order to detect all remarkable events. It processes the information thus obtained, and according to the provided operation, updates the information that it knows concerning the exchange situation, or controls appropriate operations by sending orders corresponding to the exchange signalling and switching units.

At least two central units are provided, sufficiently powerful so that in case of failure of one of them, the other takes over all the tasks to be performed. The scanners and the order drivers are common to both central units which alternately use them according to the needs. In a normal state, that is in the absence of defect, several operating modes can be contemplated. In the "normal-reserve" operation, one single central unit insures the processing of all calls, the other central unit being ready to intervene in case of failure of the first one. In the "call load sharing" operation, each central unit takes in charge one part of the traffic and processes totally the calls handled by it.

SUMMARY OF THE INVENTION

The invention is applicable to the above second operating mode. According to an embodiment, in a telephone exchange, each central unit causes the operation of a line scanner at regular time intervals. The line scanner alternately works for either central unit. When this scanner finds calling lines, it informs the concerned central unit and supplies the identities of the concerned lines. The central unit records these identities in a queuing file. Besides, the central unit reads-out at regular time intervals the contents of the preceding queueing file. It processes the corresponding calls, if they have not already been handled by the other central unit, and indicates to the latter the calls it handles. In fact, the operation of a central unit is sufficiently fast so that it may be considered, for simplification reasons, that the calls detected by a central unit are also processed by it. In such a system, the load of each central unit depends upon the position of the scanner which works for it compared to the position it occupied when it worked for the other central unit. Indeed, if the scanning of certain lines, for one central unit, immediately precedes the scanning of the same lines for the other central unit, it is obvious that the first central unit will handle almost all the calls, whereas the other will handle the small number of calls which may arrive on these lines between two very close passages of the scanner. In order that the loads of both central units be equal, it is necessary that the scannings for each of them be phase-shifted by 180°. In certain realizations, it may be structurally impossible to phase-shift exactly by 180° both central unit scannings. Nevertheless, if the load is to be equalized, additional means must be provided. The invention thus supplies means for equalizing in such a case the load between both central units. But, moreover, it may be necessary to notify, always by taking into account the above-mentioned phase-shift, the load sharing in certain cases of operation. For example, upon testing the program of one computer, it may be necessary to reduce the load of this computer and consequently to increase the load of the other. Other cases of operation specific to telephone exchanges entailing a momentary overload such as call metering by one computer may also render necessary a modification of the load sharing.

The invention meets these requirements by supplying a system enabling the load sharing between several computers according to any pre-determined proportions.

This system is characterized in that it includes a first memory device for recording a number of calls to be counted, a call counting device, a first comparator receiving from the previous devices the number of calls to be counted and the number of counted calls and supplying an identity signal if they are equal, a first logic device conditioned by the identity signal and started at the arrival of a call for supplying a re-initialization signal, as well as a second memory device for recording a number of calls to be processed, a counting device for processed calls, a second comparator receiving from the previous devices the number of calls to be processed and the number of processed calls and supplying an output signal if they are equal, a second logic device conditions by the absence of output signal from the second comparator and started at the arrival of a call, for supplying a call processing control signal, these units being arranged in order that from a first call, all calls are processed until the second comparator indicates identity and that afterwards subsequent calls are continued to be counted by the counting device and processed by the second processor until the first comparator indicates identity with the number of calls to be processed and then supplies a re-initialization signal which causes the system to return to its original state.

BRIEF DESCRIPTION OF THE DRAWINGS

Various other features will be disclosed from the following description given by way of non-limited example referring to FIGS. 1 to 5 which represent.

DESCRIPTION OF PREFERRED EMBODIMENTS

Figure 1:
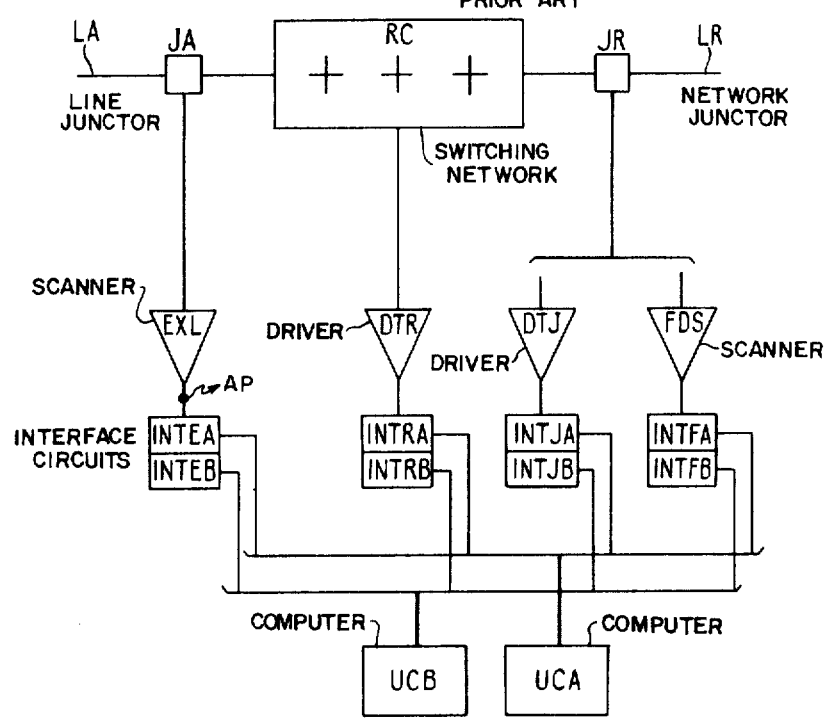
FIG. 1, the block diagram of a central control telephone exchange wherein may be used the system according to the invention.

FIG. 1 represents the simplified block diagram of a central control telephone exchange. The subscribers' lines LA are each terminated by a subscriber's line individual equipment or subscriber's junctor JA. Via its subscriber's junctor JA, each line is connected to an outlet of a switching network RC. As an example, there has been represented a switching network constituted by three stages of crossbar switches. The inlets of this network RC are connected to common units of various types, according to the requirements, among which have been represented junctors JR. A junctor JR has two accesses, one of which is connected to an inlet of the switching network RC and the other, for example, to a circuit LR leading towards another exchange. It is provided for the establishment of a call between a line such as LA and circuit LR through the switching network RC. Junctor JR supplies on the line and circuit the necessary currents and signals. It enables the call supervision and, in particular, the detection of the call termination.

The operation of this exchange is controlled by two central units UCA and UCB which are stored program electronic computers. These central units receive information supplied by the subscribers' junctors JA, through a line scanner EXL and by the common units such as junctors JR, through a unit scanner FDS. Each central unit processes the information thus obtained, in a way defined by the stored program, and deduces the actions to be taken with the view of call establishment, that is, mainly, the connections to be set up in the switching network RC and the signals that the common units must send on the lines and circuits. The corresponding orders are transmitted to the switching network RC via a driver DTR and to the common units via a driver DTJ.

Scanners EXL and FDS as well as drivers DTR and DTJ are common to both central units UCA and UCB. They are accessible via couples of interface circuits such as INTEA, INTEB. The central unit UCA accedes to scanner EXL through the interface circuit INTEA, to driver DTR through the interface circuit INTRA, etc. The central unit UCB accedes to scanner EXL through the interface circuit INTEB, to driver DTR through the interface circuit INTRB. A mutual exclusion device impedes the simultaneous operation of both interface circuits INTEA and INTEB in order to hinder the simultaneous connection of both central units UCA and UCB to scanner ExL. In normal operation, the exchange units are alternately scanned by one central unit and then by the other. One central unit which detects a call processes it and informs the other which will then not process this call if it also detects it.

In certain cases, it may be required that one central unit does not take into account all the calls it detects. For example, when a central unit tends to detect more calls than the other, it is allowed to process only a certain number of the calls it detects in order to share equally the load between both central units. The calls not accepted will then be processed by the other central unit. Thus, if one central unit detects three quarters of the calls and the other one quarter of the calls, the load will be equalized between both central units by authorizing the first central unit to process only two thirds of the calls it detects, the other third being processed by the second central unit. In the same way, when a telephone exchange is extended, a new program is loaded in one central unit, and it must be first tested, which brings an additional load to the central unit. To reduce the load of the latter and enable a correct test of the program, it is desirable to limit to a small number the calls it must process among those detected.

According to the sharing ratio that it is required to attribute to both central units, it is thus determined, for each of them, a call acceptance ratio fixing the number of calls that the central unit must process among the calls detected.

Many details concerning a call load sharing system of the kind disclosed in FIG. 1 and elsewhere in this application are shown in the literature covering telephone switching systems identified by trademarks such as "Metaconta" and "Metaconta L" telephone switching systems. These systems are large electronically controlled switching systems which have been developed over a period of years in large laboratories devoted to research in telephone switching systems. Disclosures relating to these systems and the programs of the computers employed are to be found in U.S. Pat. Nos. 3,557,315; 3,562,716; 3,760,113; and 3,786,431 as well as in publications such as Kobus et al "Central Control Philosophy for the Metaconta L Switching System", Electrical Communications, Volume 47, November 3, 1972, pages 159 to 163; H. Nordsieck "The Metaconta Switching System", Electrical Communications, Volume 46, November 4, 1971, pages 233 to 234 and S. Kobus et al "Metaconta L: Stored Program Control of Latching Crosspoint Matrices", Electrical Communications, Volume 46, Nov. 4, 1971, pages 235 to 245.

Figure 2:
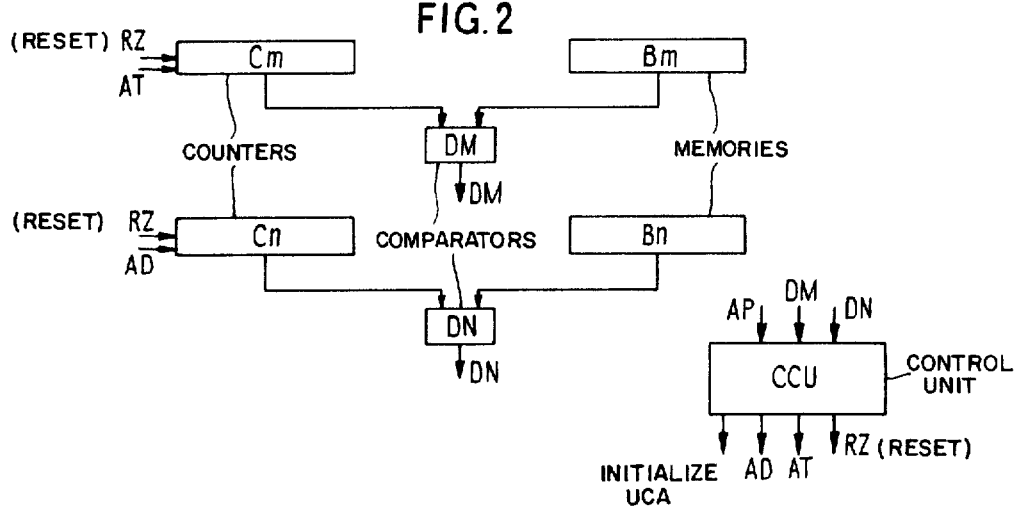
FIG. 2, a simplified block diagram of a control unit illustrating the call sharing technique of the system according to the invention.

Now will be described the operating principle of the load sharing system, according to the invention illustrated by diagram of FIG. 2.

This diagram represents, for central unit UCA e.g, two memory cells Bm, Bn, two counters Cm, Cn, two comparators DM, DN, and central control circuits CCU.

The call acceptance ratio to be applied in central unit UCA is given by a number BM of calls that the central unit must process among a number BN of calls that it will detect. Number BM is recorded in memory cell Bm and number BN in memory cell Bn. Counters Cm and Cn step once under control of signals AT and AD respectively. They are reset by signal RZ. Comparator DM compares the position of counter Cm with the contents of memory cell Bm; it operates and delivers a signal DM when there is identity. In the same way, comparator DN compares the position of counter Cn with the contents of memory cell Bn; it operates and delivers a signal DN when there is identity. Circuits CCU operate under control of signals AP, DM and DN; they supply control signals AT, AD and RZ according to the signals they receive.

It will be assumed initially that counters Cm and Cn are in position O.

The numbers respectively indicated by counters Cm and Cn are different than the respective numbers stored in memory cells Bm and Bn. Comparators DM and DN do not thus supply signals DM and DN. At each call detected by the central unit UCA through scanner EXL (FIG. 1), circuits CCU receive a signal AP. In exchange, circuits CCU supply a signal AT which makes counter Cm step once and a signal AD which makes counter Cn step once. Moreover, they supply a signal TT which initiates and controls by means not shown herein, the call processing using unit UCA. This operation recurs each time unit UCA detects a call, until the position of counter Cm takes the value BM contained in register Bm. At that time, comparator DM operates and supplies a signal DM to circuits CCU. Further on, at each call detection, circuits CCU receiving signals AP, supply signal AD only to counter CN. They do not supply signal TT and consequently the call processing is handled by unit UCB. This situation persists until the position of counter Cn reaches the value BN contained in register Bn. Comparator DN then supplies signal DN to control circuits CCU. The latter supply a signal RZ which, sent to counters Cm and Cn reset them. The system is once again in the initial state and the above-described process recommences. It can be seen that during this process, control unit CCA has detected BN calls and that among them unit UCA, it has processed BM calls. For the BN calls detected, the ratio defined by the values stored in memory cells Bm and Bn has thus been duly respected.

Figure 3:
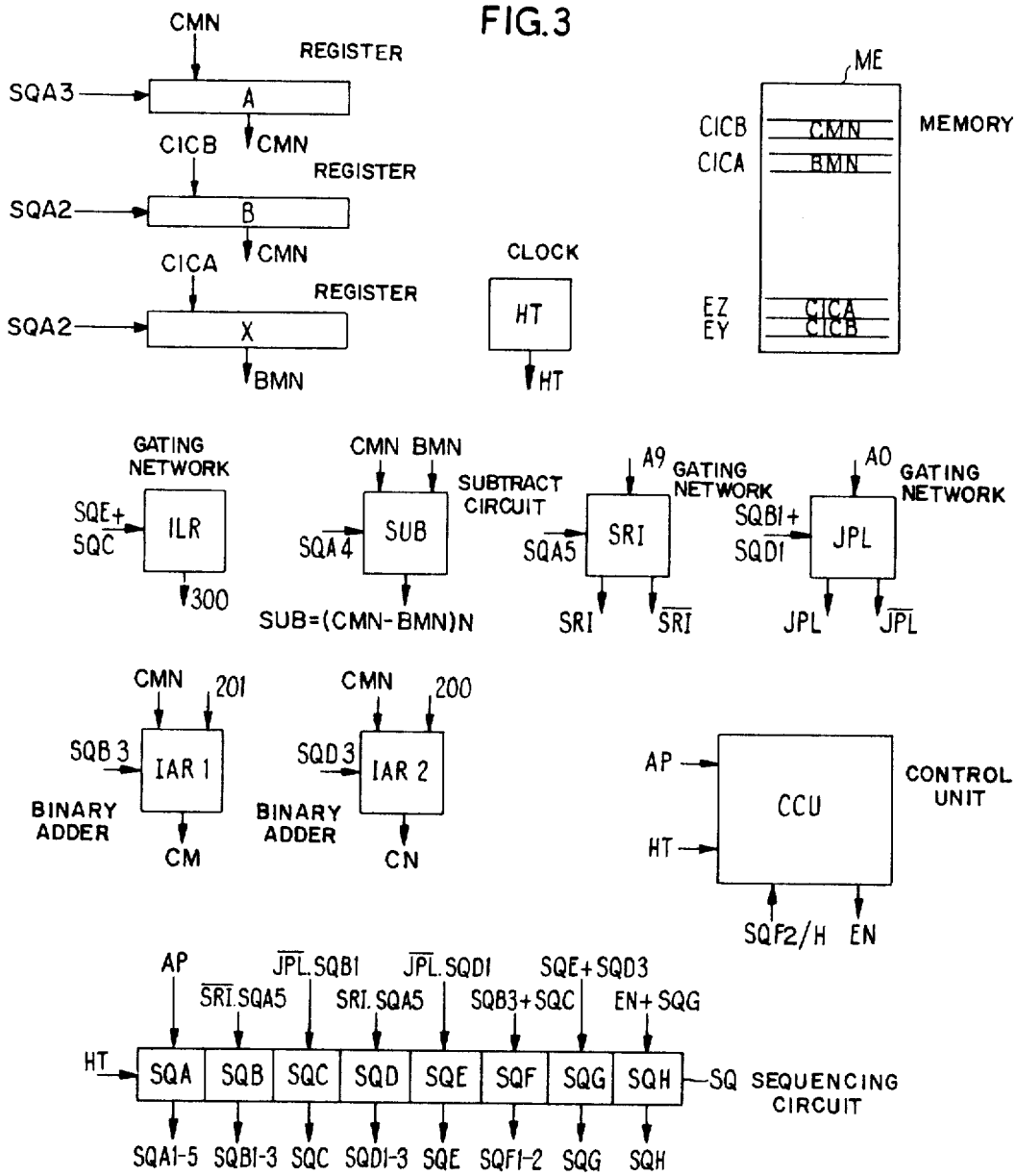
FIG. 3, the block diagram of the circuits operating the system to the invention.
Figure 4:
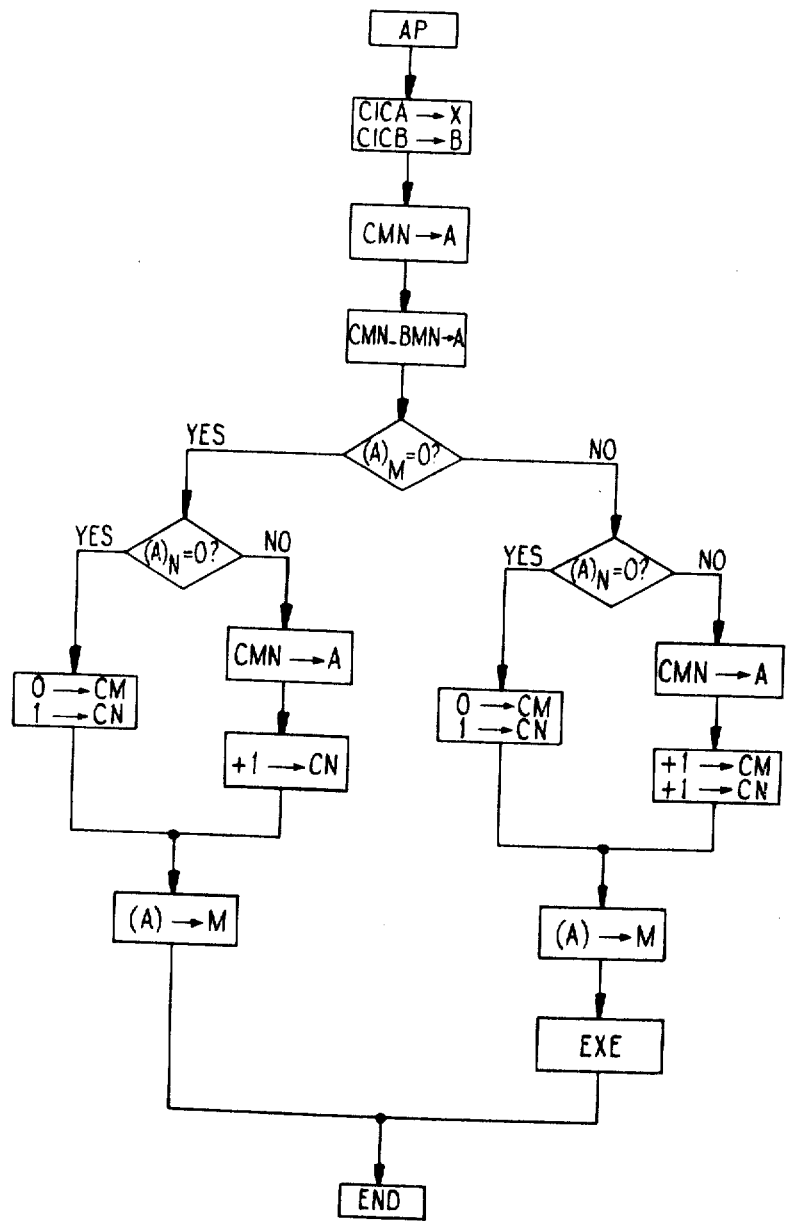
FIG. 4, an operational flow chart of the circuits in FIG. 3 and FIG. 5, the contents of memory cells CMN, BMN and register A at various operating stages of the circuits in FIG. 3.

Referring to FIGS. 3, 4 and 5, now will be described an embodiment of the system, according to the invention.

FIG. 3 shows in block diagram form the circuit elements and labelled conductors by which the elements can be joined to form a circuit. The circuit elements of FIG. 3 include memory ME, three registers A, B, X, a sequencing circuit SQ, control circuits CCU, a clock HT and various binary adders, wherein called operators ILR, SUB, SRI, JPL, Iari and IAR2.

Memory ME is constituted by memory cells certain addresses of which are mentioned on the left of the memory.

Registers A, B and X record information received on conventional inlets from the system. They display their contents on their output such as (A) for register A, (B) for register B and (X) for register X.

Sequencing circuit SQ has eight main positions SQA to SQH. Each position may have several auxiliary positions such as positions SQA1 to S2A5 of SQA. Sequencing circuit SQ is set in a main position under control of a signal or of a signal combination indicated in FIG. 3, above the considered position. As known in logic algebra, a point represents an AND function and a (+) represents an OR function. In a determined main position, the sequencing circuit automatically and successively passes by the different auxiliary positions.

The operators IAR1 and IAB2 have a control input located on the left side. They operate under control of a signal applied to this input. The function of operator ILR is to supply a constant information of octal value 300. Operator SUB receives on two data inputs (upper side) data (A) and (X)*, calculates the difference between both data and supplies the resultant value on its output SUB. The function of operators SRI and JPL is to analyse the value (0 or 1) of a binary element or bit (A9 for SRI and AO for JPL) and to supply a signal on their lower left inputs (SRI, JPL) if the bit has the value 1 or a signal on their lower right inputs (SRI, JPL) if the bit has the value of 0. The function of operators IAR1 and IAR2 is to add a constant (201, 200) to a datum (A).

It will be initially assumed that all circuits are at rest and in position 0. The memory cell located at the address CICA contains an information BMN with 16 bits numbered from 0 to 15 from the left, such as illustrated on line BMN of FIG. 5. This information is constituted by a number BM and by a number BN. These numbers have been chosen in order to bring a determined sharing ratio of the load between both central units of the figure, so that central unit UCA has to process M calls among the N detected calls. According to the chosen example of FIG. 5, BM and BN have the following values in binary form:

BM = 10110
and BN = 1000110

Unit UCA will thus have to process 22 calls among the 70 detected calls.

The memory cell located at the address EZ contains address CICA. It will further enable circuits CCU to find numbers BM and BN. It will be noted that this addressing mode results in a greater flexibility of the system. Indeed, it is possible to provide other memory cells such as address cell CICA and to note therein other values of BM and BN corresponding to other sharing ratios of the load between both central units. According to the chosen sharing ratio, there is noted in cell EZ the address of the memory cell (CICA according to the chosen example) in which are indicated the corresponding values of BM and BN.

The memory cell located at the address CICB contains a variable information including 16 bits numbered from 0 to 15 from the left, such as illustrated on line CMN1 of FIG. 5. This information is constituted by a number CM whose original value is 1000000 and by a number CN whose value is 1. The address CICB is written in cell EY.

When the first call is detected, circuits CCU receive a signal AP, which initializes the operating process of the circuits in FIG. 3 and which is illustrated by square AP of FIG. 4.

Signal AP sets sequential circuit SQ in the main position SQA1, sequential circuit SQ controls, by non-represented means, the reading process of cell EZ. Its contents CICA are written into register X. This operation being completed, sequencing circuit SQ steps to position SQA2. The contents CICB of cell EY are also read-out and written into register B. These two operations are mentioned in the flow chart of FIG. 4, in the form CICA→X; CICB→B. Then sequencing circuit SQ steps to position SQA3. The contents CMN of the cell located at the address CICB supplied by register B are read-out and transferred to register A, which is indicated in FIG. 4 in the form CMN→A. Then sequencing circuit steps to position SQA4. Signal SQA4 is applied to operator SUB. Contents (A) of register A which is the information CMN is supplied to operator SUB. Contents (BMN) of the memory cell whose address (CICA) is stored in register X, which is indicated by (X)* in FIG. 3, is read-out and also supplied to operator SUB. The latter subtracts information BMN from information CMN and writes the result into register A. This operation is mentioned in the form CMN-BMN→A in FIG. 4. Information BMN and CMN having the values mentioned on lines BMN and CMN1 of FIG. 5, the result of the subtraction has the value mentioned on line SUB1, that is:

1 1 0 1 1 1 0 1 1 0 1 0 1 0 1 0

In fact, the value of CM being superior to that of BM, it may be considered that this subtraction comes to subtract BM from CM and BN from CN.

Sequencing circuit SQ then steps to position SQA5 and controls, by means of signal SQA5, the operation of operator SRI. This operator examines the value of the binary element of rank 9 of the result SUB1 recorded in register A (see FIG. 5). This bit A9 has the value 0, which means that taking into account the original value of CMN, the number of processed calls has not yet reached number BM. The examination of bit 9 of SUB1 thus comes to ask the question: "has the number of processed calls reached number BM?", which is illustrated in FIG. 4 by the rhomb containing the mention (A)$_M$ = 0→ The answer being negative, operator SRI supplies signal $\overline{SRI}$. The combination of both signals $\overline{SRI}$ and SQA5 cause sequential circuit SQ to step to position SQB. In FIG. 4, the system operation is routed onto the link NO of the above-mentioned rhomb.

Signal SQB1 operates operator JPL. The latter examines the value of the 0 rank bit of result SUB1 recorded in register A. This bit A0 has the value 1 which indicates that the number of detected calls has not yet reached number BN. The examination of bit 0 of SUB1 thus comes to ask the question: "has the number of detected calls reached number BN?", which is illustrated in FIG. 4 by a rhomb containing the mention (A)$_N$ = 0? The answer being negative, the sequential circuit steps to position SQB2; the system operation is routed onto link NO of the considered rhomb of FIG. 4. Signal SQB2 controls the reading of contents CMN of the address cell CICB stored in register B. The read-out information CMN is stored in register A. Sequential circuit SQ then steps to position SQB3. Signal SQB3 initiates operator IAR1. The latter then receives the contents of register A and a constant 201 of binary value 10000001; it adds these two values. This operation comes to index by one unit each number CM and CN of information CMN, which is illustrated by mentions +1→CM and +1→CN in FIG. 4. The resultant information CMN is stored in register A.

Then sequential circuit SQ automatically steps to position SQF1 under control of signal SQB3 and controls the writing of contents CMN of register A to the memory cell CICB whose address CICB is stored in register B. The new value of CMN, whose numbers CM and CN have been indexed by one unit, thus takes the place of the previous value. This operation is noted (A)→M in FIG. 4. Sequential circuit SQ then steps to position SQF2 and supplies signal SQF2 which, transmitted to circuits CCU, initializes the call processing (operation EXE in FIG. 4). When this processing is over, circuits CCU supply signal EN which controls the stepping of sequential circuit SQ to position SQH. Signal SQH resets sequential circuit SQ and indicates to circuits CCU the end of the undertaken process (phase END in FIG. 4).

This process recurs upon detection of each call. It will thus be now considered that, during such a process, the number of processed calls equals number BM. The operations corresponding to positions SQA1 to SQA3 of sequential circuits SQ have been carried out as above-seen. Register X contains address CICA, register B, address CICB and register A, information CMN. Information CMN has the value written on line CMN2, numbers CM and CN constituting it having been both increased by values BM, that is 10110 in binary form.

Under control of sequential circuit S2 in position SQA4, operator SUB subtracts information BMN from information CMN and stores the result in register A. The result obtained has the value noted on line SUB2 of FIG. 5. In particular, part BM of the contents of A has the value 1000000.

As above, under control of sequential circuit SQ (signal SQA5), operator SR1 examines the value of the bit of rank 9 of register A contents; it notes that it has the value 1 and accordingly supplies signal SRI. This means that counter CM has reached the value of number BM. Under control of signals SRI and SQA5, sequential circuit SQ steps to position SQD. In FIG. 4, it can be seen that the system operation is routed onto the link YES of the rhomb containing the mention (A)$_M$ = 0?

Signal SQD1 initiates operator JPL which examines the value of the bit of rank 0 of the result SUB2 stored in register A. This bit has the value 1. Signal JPL is delivered. The number of detected calls has not yet reached number BN. In FIG. 4, this examination is illustrated by a rhomb containing the mention (A)$_N$ = 0? The system operation is routed onto the link NO. The sequential circuit steps to position SQD2. The memory cell CICB is read-out and its contents CMN are stored in register A. Sequential circuit SQ steps to position SQD3. Signal SQD3 controls the operation of operator IAR2 which adds to the contents of A a constant 200 of binary value 10000000. This operation comes to index by one unit number CN of information CMN, which is indicated by +1→CN in FIG. 4. The result is stored in register A.

Under control of the signal SQD3, sequential circuit SQ steps to position SQG during which the contents of A, that is the new value of CMN, is written into memory cell CICB and then to position SQH corresponding to the end of operation (END).

The system, according to the invention, continues to operate, thus counting the number of detected calls by making in information CMN vary, until number CN equals number BN. When this arrives, information CMN has the value written on line CMN3 of FIG. 5. The value of the difference between information CMN and BMN is written on line SUB3 of FIG. 5.

When during the next call, the sequential circuit being in position SQD1, operator JPL examines the value of the bit of rank 0 of register A contents, it finds it equal to 0. It then controls by the combination of signals $\overline{JPL}$ and SQD1, the passage of sequential circuit SQ to position SQE which initiates operator ILR whose function is to supply a constant 300 of binary value and to write it into register A. In this way, CMN has again the value of line CMN1 of FIG. 5. This operation is noted 0→CM and 1→CN in FIG. 4. It is to be noted that the value of CN is not 0 at the beginning of a process such as above-described, but 1, due to the fact that the indexing of CN occurs after the analysis of the value of the bit 0 of CMN and not before it.

Then sequential circuit SQ steps to position SQG and the new contents of A are stored in memory cell CICB. Then in position SQH, sequential circuit SQ stops the operation.

It can thus be seen that the system, according to the invention enables each processing unit to process only one part of the calls it detects according to the value of a ratio determined by numbers BM and BN.

Moreover, it will be noted that in position SQB1, sequential circuit SQ initiates operator JPL to examine the value of the 0 rank bit of CMN, that is to know if number CN has reached the value of BN. If the 0 rank bit of CMN has the value 0, signal $\overline{JPL}$ is supplied and sequential circuit SQ steps to position SQC, which is illustrated by the link YES of the right rhomb in FIG. 4. Signal SQC initiates operator ILR and, therefore the writing of constant 300 into register A. Then sequential circuit steps to positions SQF1, SQF2 and SQH during which the contents of A are stored in cell CICB, the detected call is processed and the operation of the thus described process is completed. This last contemplated case of operation corresponds to the case when the value of BN is inferior or equal to the value of BM and when all the detected calls must be processed.

It is obvious that the preceding description has only been given as an unrestrictive example and that numerous alternatives may be considered without departing from the scope of the invention. In particular, the numerical examples have only been given to facilitate the understanding of the invention.

We claim:

1. A call load sharing apparatus for a communications system in which said apparatus processes the completion of calls through the system, said apparatus including a first processor for processing a first plurality of calls through said system and a second processor for processing through said system calls other than said first plurality of calls, said apparatus including a first memory for storing a predetermined first number indicative of the calls which are to be processed through said system, a second memory for storing a lesser number, the lesser number representing the number of said first plurality of calls to be processed by said first processor, scanning means receptive of calls from the system for initiating the processing of calls by said first processor, a first counter responsive to all calls received by the scanning means for producing a first count representing a total of the calls received for processing, a second counter responsive to calls being processed by said first processor for producing a second count, a comparator for comparing the second count against the number stored in said second memory, said second comparator responsive to an equality between said second count and the second number for producing an output signal, and a control unit responsive to the output signal for causing subsequent calls received by said scanning means to be processed by said second processor.

2. Apparatus as claimed in claim 1, in which there is another comparator for comparing said first count against the number stored in said first memory, said other comparator generating a reset signal when said second count exhibits equality with said first number for resetting the load sharing apparatus to cause subsequent calls to be processed by said first processor.

* * * * *